United States Patent
Pos

(10) Patent No.: US 9,738,182 B2
(45) Date of Patent: Aug. 22, 2017

(54) CHILD SEAT FOR A MOTOR VEHICLE

(71) Applicant: CYBEX GMBH, Bayreuth (DE)

(72) Inventor: Martin Pos, Bayreuth (DE)

(73) Assignee: CYBEX GmbH, Bayreuth (DE)

( * ) Notice: Subject to any disclaimer, the term of this patent is extended or adjusted under 35 U.S.C. 154(b) by 0 days.

(21) Appl. No.: 14/839,632

(22) Filed: Aug. 28, 2015

(65) Prior Publication Data

US 2016/0059747 A1 Mar. 3, 2016

(30) Foreign Application Priority Data

Aug. 29, 2014 (DE) .................... 20 2014 104 056 U

(51) Int. Cl.
 *B60N 2/28* (2006.01)

(52) U.S. Cl.
 CPC ......... *B60N 2/2878* (2013.01); *B60N 2/2812* (2013.01); *B60N 2/2821* (2013.01); *B60N 2/2845* (2013.01); *B60N 2/2854* (2013.01); *B60N 2/2875* (2013.01); *B60N 2002/2818* (2013.01)

(58) Field of Classification Search
 CPC .. B60N 2/2878; B60N 2/2821; B60N 2/2854; B60N 2/2812; B60N 2/2845; B60N 2/2875; B60N 2002/2818
 USPC .................................. 297/250.1, 484, 256.1
 See application file for complete search history.

(56) References Cited

U.S. PATENT DOCUMENTS

| | | | | |
|---|---|---|---|---|
| 4,342,483 A * | 8/1982 | Takada | ................. | B60N 2/2812 280/751 |
| 5,685,605 A * | 11/1997 | Kassai | ................. | A47D 13/105 297/250.1 |
| 6,135,553 A * | 10/2000 | Lovie | ................... | B60N 2/2821 297/250.1 |
| 6,491,348 B1 * | 12/2002 | Kain | .................... | B60N 2/2812 297/250.1 |
| 6,679,552 B1 * | 1/2004 | Kassai | ................. | B60N 2/2812 297/250.1 |
| 6,808,232 B2 * | 10/2004 | Takizawa | ................. | B60N 2/06 297/256.1 |

(Continued)

FOREIGN PATENT DOCUMENTS

| DE | 69923281 T2 | 2/2006 |
|---|---|---|
| DE | 202011000229 U1 | 6/2011 |

(Continued)

OTHER PUBLICATIONS

Supplementary search report and opinion issued in related European application EP 15181315.1, dated Feb. 8, 2016, 7 pages.

*Primary Examiner* — Milton Nelson, Jr.
(74) *Attorney, Agent, or Firm* — Drinker Biddle & Reath LLP

(57) ABSTRACT

A child seat for a motor vehicle having a carry shell with a carrying grip and a seat unit arranged within the carry shell having a back portion, a seat portion, and a leg portion. An upper backrest is fitted on the back portion of the seat unit for movement in a direction to and from the seat portion. The child seat also has a device for altering the position of the upper backrest relative to the back portion, and a harness with two shoulder straps, each shoulder strap being passed through a corresponding slot in the back portion and in the upper backrest, with pivotally mounted strap guides each being assigned to the belt slots in the back portion.

11 Claims, 6 Drawing Sheets

(56) References Cited

U.S. PATENT DOCUMENTS 7,469,965 B2 * 12/2008 Glover .................. A44B 11/10
297/250.1
9,056,567 B2    6/2015 Wuerstl

FOREIGN PATENT DOCUMENTS

JP         2007246061 A  *  9/2007
WO        2012/014555 A1    2/2012

* cited by examiner

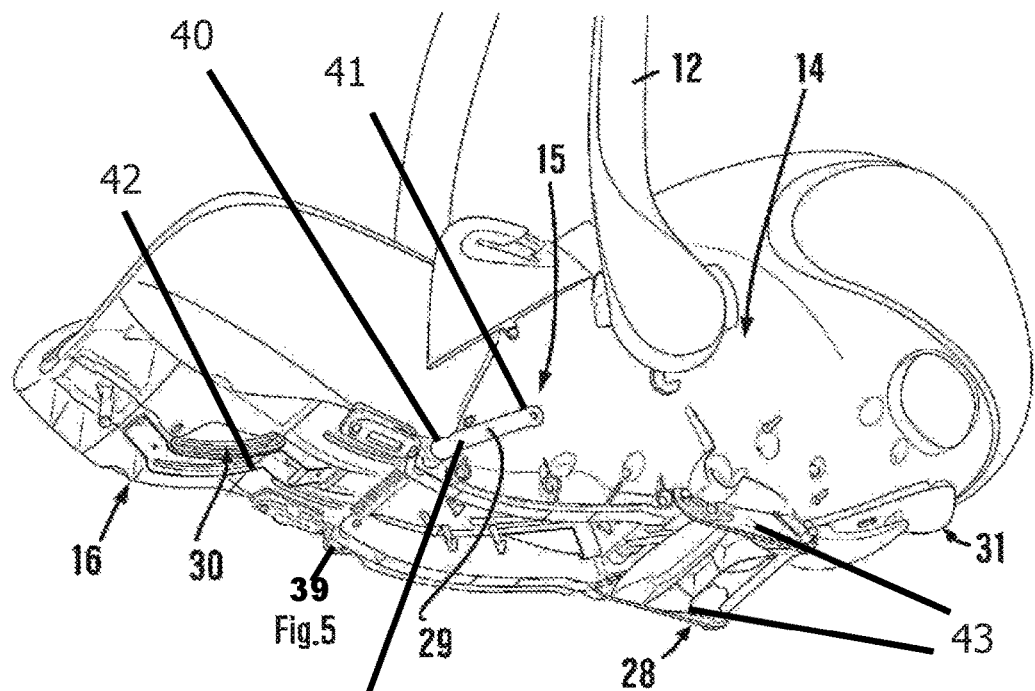
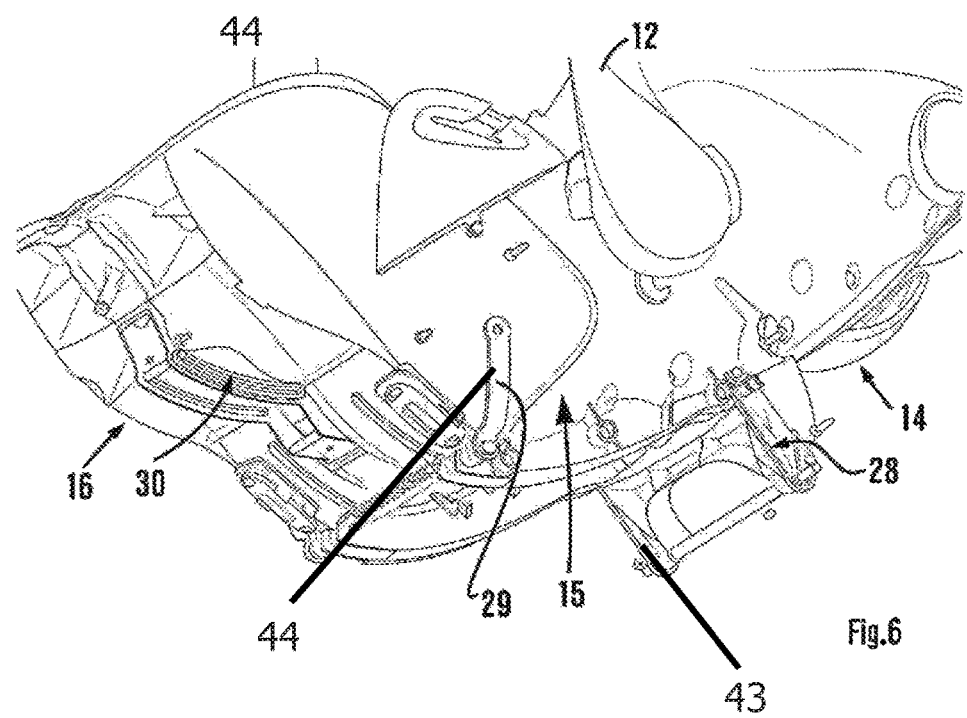

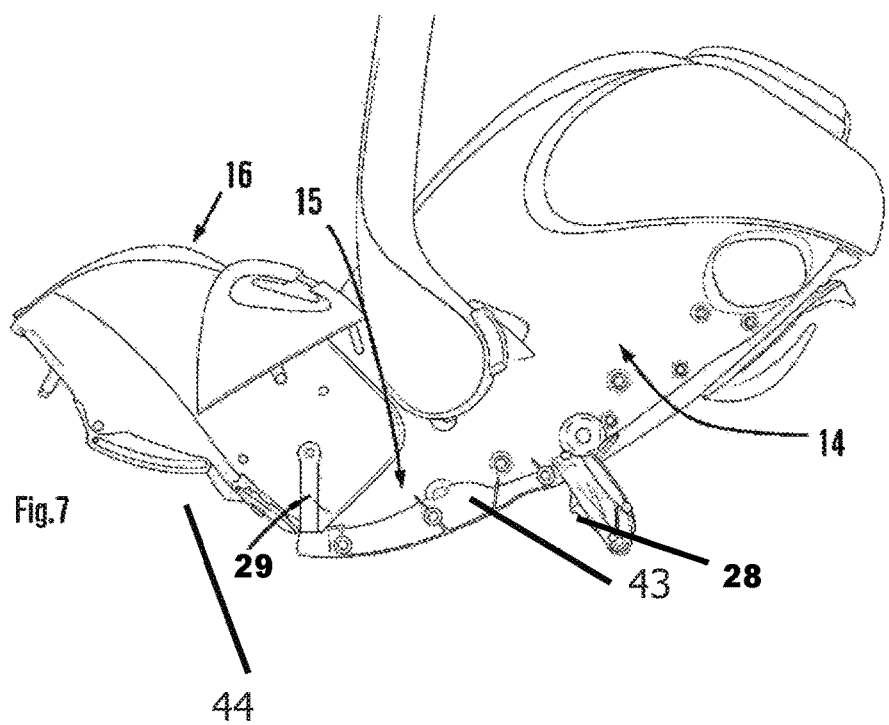
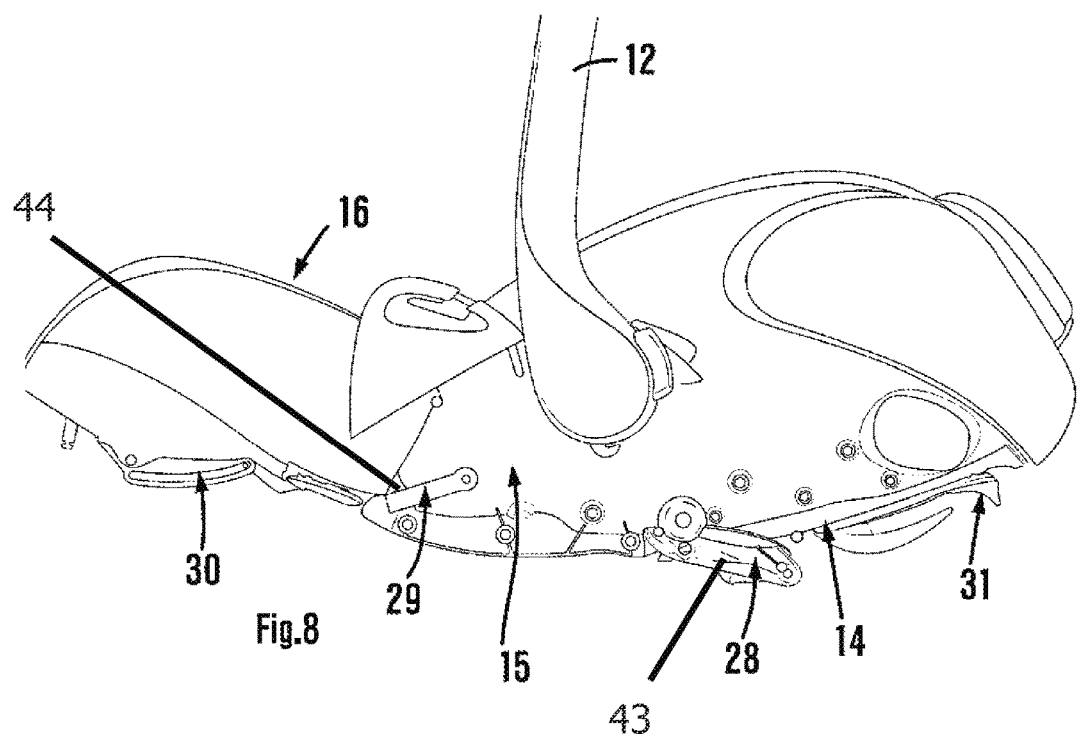

CHILD SEAT FOR A MOTOR VEHICLE

CROSS-REFERENCE TO RELATED APPLICATION

This application claims priority to and the benefit of German Patent Application No. 20 2014 104 056.0 filed Aug. 29, 2014, the entire content of which is incorporated herein by reference.

FIELD

Disclosed herein is a child seat for a motor vehicle having a carry shell with carrying grip and a seat unit arranged within the carry shell.

Such child seats are known, for example, from DE 699 23 281 T2. It describes a child seat for a motor vehicle comprising a seat body with a back portion and a seat portion. An upper backrest is fitted on the back portion for movement in a direction to and from the seat portion. A position of the upper backrest can be varied relative to the back portion via a "control device".

Overall, DE 699 23 281 T2 permits a certain adjustment to the sitting and reclining position of a (particularly very young) child. However, it is considered that this adjustment can still be improved, particularly with regard to the strap guide and the sitting/reclining position of the child.

SUMMARY

Embodiments disclosed herein provide a child seat for a motor vehicle, whereby the adjustment of a seat position is to be improved, particularly with reference to the strap guide and/or varying the seat position.

This object is particularly achieved by a child seat for a motor vehicle having a carry shell with carrying grip (e.g. carry strap) and a seat unit arranged within the carry shell. The seat unit comprises a back portion, a seat portion, a leg portion, an upper backrest, which is fitted on the back portion of the seat unit for moving in a direction to and from the seat portion, a device to alter the position of the upper backrest relative to the back portion, and a harness with two shoulder straps, each shoulder strap being passed through a corresponding slot in the back portion and in the upper backrest, pivotally mounted strap guides each being assigned to the strap slots in the back portion.

Thus, a key embodiment of the disclosure is that, in the region of the strap slot in the back portion, strap guides are provided which are pivotally mounted. Through such pivotability, frictional force in the strap guide can be easily reduced and, particularly, distortion of the strap can be prevented (or at least the risk of such distortion reduced).

Preferably, the strap guides on the rear of the back portion are each pivotally mounted about axles extending (approximately) perpendicularly to the back portion. In this way, twisting of the shoulder straps and an undesired increase in friction within the strap guides is particularly effectively reduced (or completely avoided).

In a practical embodiment, the two shoulder straps on the rear of the back portion are merged into, in other words connected to, a Y-strap below the two strap guides arranged on the rear. Through such a measure, the design effort is reduced, simultaneously enabling the shoulder straps to be reliably (friction-free) guided.

According to a further (independent) embodiment (which, however, can also be combined with the preceding embodiments), the above object is achieved by a child seat for a motor vehicle having a carry shell with a carrying grip and a seat unit arranged within the carry shell, the seat unit of the carry shell being displaceable from a sitting position with (relatively) upright extending back portion to a reclining position with (virtually) horizontally extending back portion (and vice versa).

A central concept of this embodiment is to configure the child seat in such a way that the back portion can be aligned (virtually) horizontally. "Virtually horizontal" is intended to mean particularly an alignment where the back portion has an angle of less than 20°, particularly less than 15° to the horizontal, said alignment being defined by an underside development of the child seat (if this is placed on a flat surface). "Relatively upright" is intended to mean particularly an angle of the back portion to the horizontal which is more than 40°, particularly more than 50°. The back portion is aligned in its sitting position preferably not exactly vertically but has an angle of less than 80°, particularly less than 65° to the horizontal. The back portion can be aligned horizontally in its reclining position but preferably has an acute angle to the horizontal, preferably at least 5°, particularly at least 10°.

In each case, the option to adjust a back portion extending (virtually) horizontally is achieved so that a safe and comfortable position is possible for the child (particularly when sleeping). The child seat is thus also well suited particularly for longer car journeys.

According to a further independent embodiment of the disclosure (which can also be combined with the preceding embodiments, particularly the embodiment relating to the horizontal extension of the back portion), a child seat for a motor vehicle having a carry shell with carrying grip and a seat unit arranged within the carry shell is proposed to achieve the above object, a leg portion being movably arranged relative to a seat portion in such a way that when the seat unit is displaced to a (particularly the above-mentioned) reclining position, the leg portion is tilted downwards relative to the seat portion, preferably so that the leg portion as well as the seat and back portion extend (virtually) horizontally in the reclining position of the seat unit.

A central concept of this embodiment is that the leg portion tilts downwards relative to the seat portion. The reclining comfort for the child is thereby further improved. In particular, long car journeys can be managed without problems.

On the one hand, the back and seat portion and, on the other hand, the leg portion are preferably each hinged to the carry shell via a linkage of rods. In such an embodiment, the seat unit can be transferred to the reclining position in a design-simple manner.

In a practical embodiment, the linkage of rods assigned to the back and seat portion comprises on two sides hinged connecting struts (approximately) half the length of the back and seat portion, the free ends of said connecting struts each being hinged to the carry shell. "Approximately half" the length can be taken to mean particularly a positioning between 40% and 60% of an extension of back and seat portion. In any case, such a development sets forth an extremely simple design.

In a design embodiment, the linkage of rods assigned to the leg portion comprises two laterally hinged connecting struts in the proximity of the rear end or, more precisely, the end facing the seat and back portion, the free ends of said connecting struts each being hinged to the carry shell. Particularly in combination with the linkage of rods assigned to the back and seat portion, a simple tilting of the leg portion with (simultaneously) altered sitting and reclining position is thereby achieved. Thus, a reclining position can be incorporated and the leg portion tilted downwards in one flowing movement.

In a preferred embodiment, the linkage of rods assigned to the seat and back portion extends away from the rear of this portion while the linkage of rods assigned to the leg portion extends in the opposite direction. In this embodiment, the adjustment of the reclining position and the simultaneous tilting downwards of the leg portion can be carried out with minimal application of force and in a simple manner.

When displacing the seat unit to a (virtually) horizontal reclining position or back, the leg portion is preferably mounted longitudinally displaceable in a guide connecting link arranged on the carry shell, said link being (approximately) horizontally-extending, particularly arc-shaped. The tilting downwards of the leg portion can be controlled in a simple manner via such a guide connecting link.

In a preferred embodiment, the seat unit is lockable both in the sitting position and the reclining position and, if applicable, also in one or several intermediate positions relative to the carry shell, the locking mechanism preferably being assigned a means for unlocking or unlatching. Safety and variability in relation to the child seat is increased by such a measure.

Further embodiments are revealed from the dependent claims.

BRIEF DESCRIPTION OF THE DRAWINGS

Further features and advantages will now be described based upon an exemplary embodiment, making reference to the figures, in which:

FIG. 5 shows an oblique view of the child seat according to FIGS. 1 to 4 with partially disclosed interior in a reclining position;

FIG. 6 shows the child seat according to FIG. 5 in a sitting position;

FIG. 7 shows a side view of the child seat according to FIGS. 1 to 6 with partially disclosed interior in a sitting position;

FIG. 8 shows the child seat according to FIG. 7 in a reclining position;

DETAILED DESCRIPTION

In the following description, the same reference numbers are used for the same and similarly-acting parts.

Figure 1:
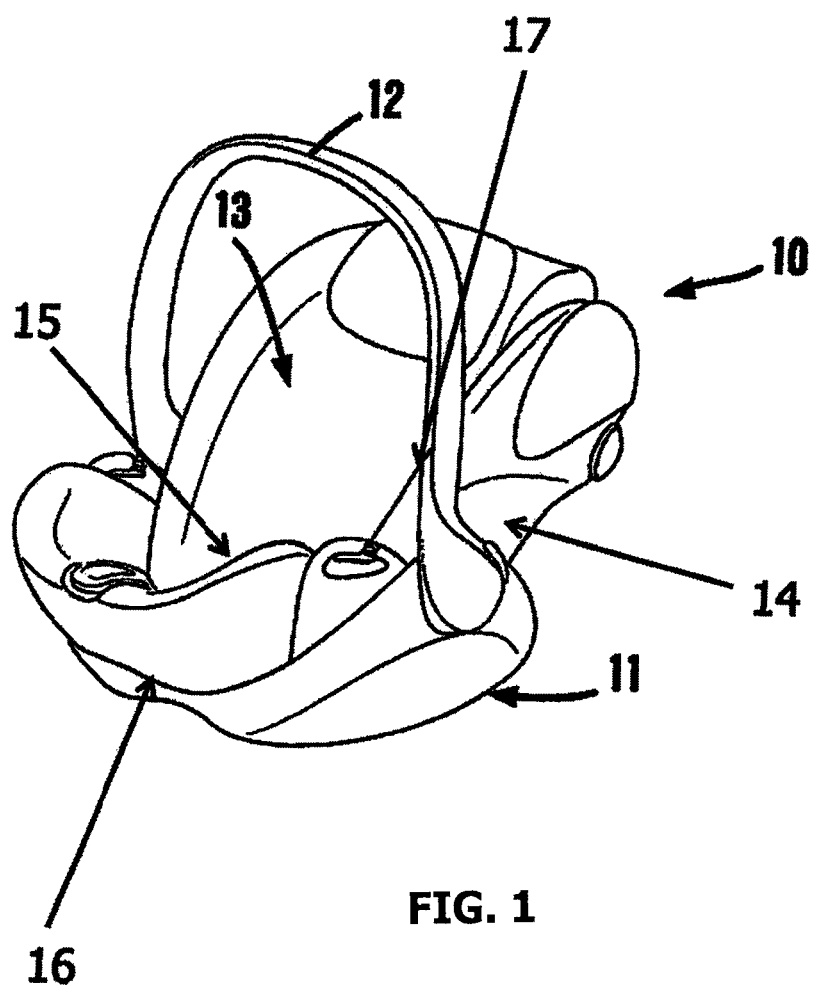
FIG. 1 shows a child seat according to the disclosure in oblique view.

FIG. 1 shows an oblique view of a child seat according to the disclosure. This has a carry shell 11, within which a seat unit 13 is arranged.

The seat unit 13 comprises a back portion 14, a seat portion 15 and a leg portion 16. A backrest 17 is movably mounted on the back portion 14 in such a way that the (upper) backrest 17 can be moved in a direction to and from the seat portion 15. Furthermore, padding can be provided (which, for the sake of simplicity, is not shown).

Figure 4:
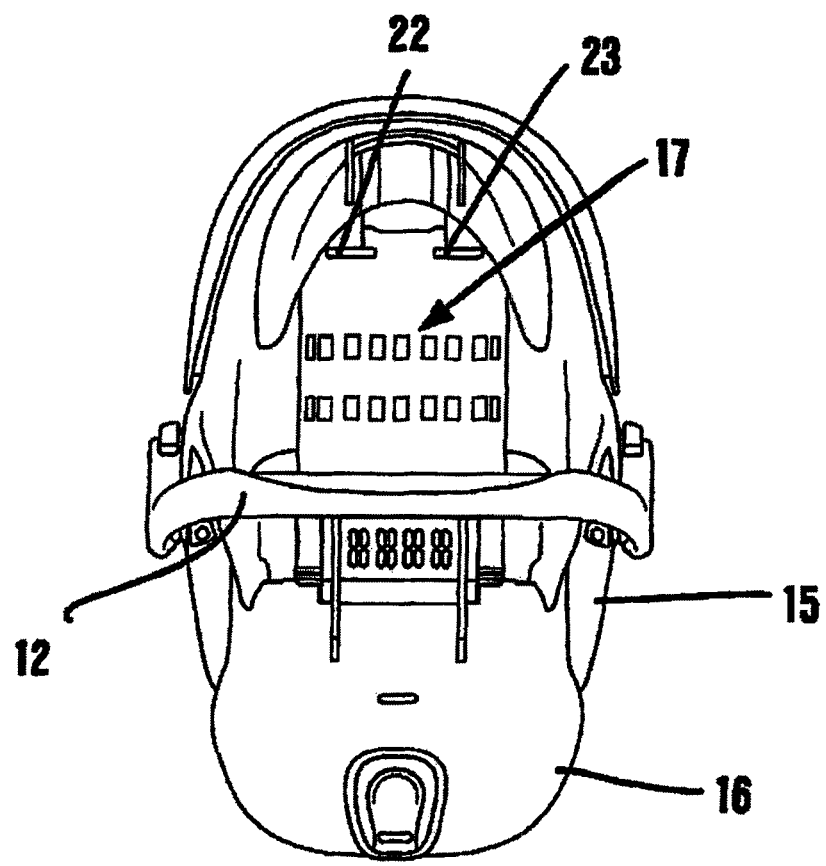
FIG. 4 shows the child seat according to FIGS. 1 to 3 in a plan view.

In FIG. 4 the backrest 17 can be seen from above. Strap slots 22, 23 are provided in the backrest 17, through each of which a shoulder strap 18, 19 (see FIGS. 9 and 10) can be guided through.

Figures 9, 10:
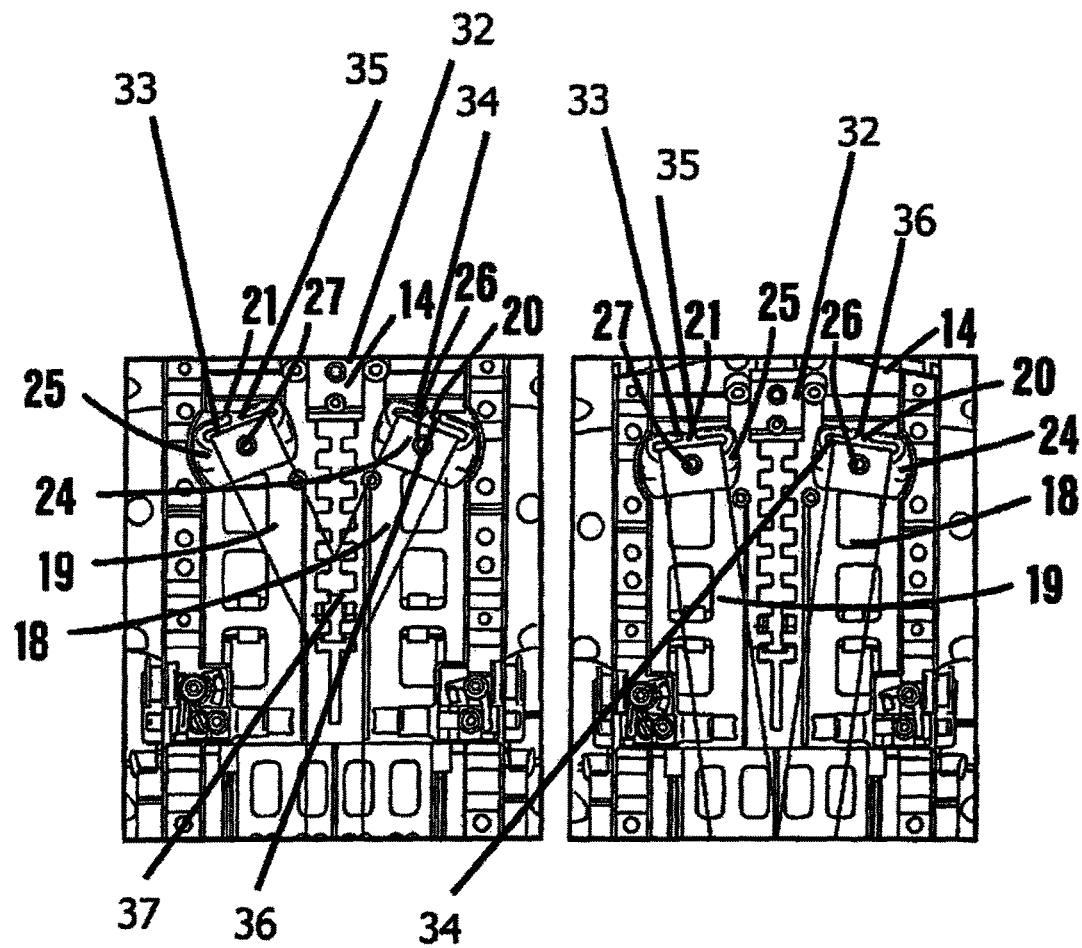
FIG. 9 shows a detail in the region of the strap deflection of the child seat in a first position.
FIG. 10 shows the detail according to FIG. 9 in a second position.

FIGS. 9 and 10 show a rear side of the back portion 14 (detail). Slots 20, 21 are also provided in the back portion 14, through which said slots the shoulder straps 18, 19 can be guided. Pivotally mounted strap guides 24, 25 are assigned to the slots 20, 21 (and thus the corresponding slots 23 and 22 of the backrest 17). In this arrangement, the strap guides 24, 25 are each pivotally mounted about an axle which is perpendicular to the back portion 14.

A device 32 (see FIGS. 9 and 10) serves to adjust a relative position between back portion 14 and backrest 17.

As can be seen from FIGS. 9 and 10, the shoulder straps 18, 19 have either a comparatively large angle to each other (see FIG. 9) or a comparatively small angle (see FIG. 10). This alteration in angle can be compensated easily through the pivotability of the strap guides 24, 25. Severe friction or distortion in the shoulder straps 18, 19 can thereby be counteracted.

The strap guides 24, 25 have (slot-shaped) receivers 33, 34, through which the corresponding shoulder strap 18, 19 can be threaded via openings 35, 36.

The shoulder straps 18, 19 are merged into a Y-strap below the strap guides 24, 25. According to FIGS. 9 and 10, a point 37 in the merging can be arranged either comparatively far up (see FIG. 9) or comparatively far down (see FIG. 10).

Figure 2:
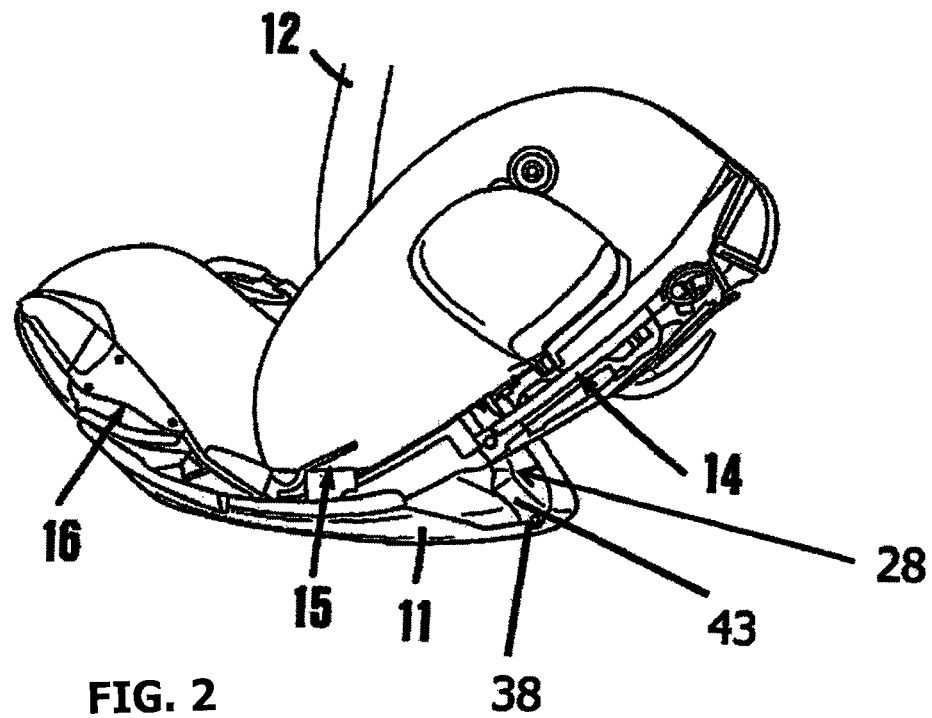
FIG. 2 shows the child seat according to FIG. 1 with partially disclosed interior in a side view and a sitting position.
Figure 3:
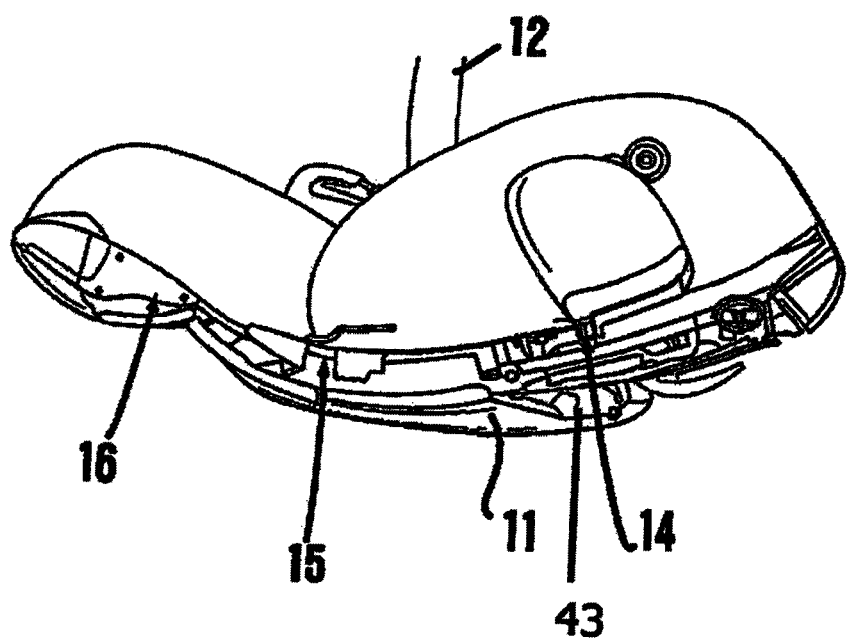
FIG. 3 shows the child seat according to FIG. 2 in a reclining position.

FIGS. 2 and 3 show side views of the child seat, an interior of the child seat being partially disclosed. In particular, shell 11 and carry grip 12 (=preferably carry handle or carry strap) are only partially represented. In this arrangement, FIG. 2 shows a sitting position and FIG. 3 a reclining position.

As can be seen from FIGS. 2 and 3, the back portion 14 extends comparatively upright (at an angle of 30 to 50°) in the sitting position (FIG. 2). In the reclining position according to FIG. 3, the back portion 14 extends (virtually) horizontally, for example at an angle of 0 to 25°.

A linkage of rods 28 (see FIGS. 2 and 3) is assigned to the back and seat portion 14, 15, said linkage of rods being fitted to the carry shell 11 in a jointed manner. The linkage of rods 28 comprises two connecting struts 43, which are hinged to the carry shell 11. The connecting struts can tilt about an axle 38, which is arranged on the carry shell 11, so that an end of the connection rods 43 which is arranged on the seat and back portion 14, 15 (also jointed) can tilt forwards and thus, together with the seat and back portion 14, 15, can be moved forwards in relation to the carry shell (see FIGS. 5 to 8). In this arrangement, the end of the connection rods 43 connected to the seat and back portion 14, 15 is (at least in the sitting position (see FIG. 2)) above the end of the connection rods 43 which is connected to the carry shell 11. In the reclining position (see FIG. 3), each of the ends of the connection rods 43 can be arranged at (almost) the same level, the end of the connection rods 43 connected to the seat and back portion 14, 15 being arranged in front of the end of the connection rods 43 which is connected to the carry shell 11.

A further linkage of rods 29 can be identified particularly in FIGS. 5 to 8. FIGS. 5 and 6 show different positions of the child seat in an oblique view, a view into the interior being partially disclosed. FIGS. 7 and 8 show corresponding side views. The linkage of rods 29 is assigned to the leg portion 16. The linkage of rods 29 comprises two connecting struts 44. A respective end 39 of the connecting struts 44 is arranged on the leg portion 16 (in practice, in a transitional region between leg portion 16 and seat portion 15) and mounted in a jointed manner relative to said leg portion so that it can be rotated about an axle 40. In the same manner, an end 41 of the connection rods 44 is also rotatably mounted, but relative to the carry shell 11 (not shown in FIGS. 5 to 8) (see FIGS. 1 to 3).

Both in the reclining position (see FIG. 5) and in the sitting position (see FIG. 6), the end 39 is arranged below the end 41. In the sitting position (see FIG. 6), the linkage of rods 29 is aligned (virtually) vertically. When transferring from the sitting position (FIG. 6) to a reclining position (FIG. 5), the connecting struts 44 swing forwards and the leg portion 16 also moves forwards relative to the carry shell.

In addition, the leg portion 16 can be tilted relative to the seat and back portion 14, 15 in such a way that it is tilted downwards in the reclining position (FIG. 5) relative to the sitting position (FIG. 6). In order to tilt the leg portion 16 downwards, a guide linking rod 30 (as a constituent part of the carry shell 11 which is otherwise not shown in FIGS. 5 and 6) is displaceably mounted via a bar 42 (which again is a constituent part of the leg portion). The guide linking rod 30 (which, to be precise, consists of two parallel-running linking rods) is configured in an arc shape thus forcing a tilting movement downwards. In the sitting position (FIG. 6), the bar 42 sliding in the guide connecting rod 30 is located at one end of the guide connecting rod 30, said end being positioned closer to the seat and back portions 14, 15. In the reclining position (FIG. 5), the bar 42 is located in a position which is further away from the seat and back portions 14, 15.

Altogether, through cooperation of the linkage of rods 28, 29 and the guide connecting rod 30 through a forwards movement of the seat unit 13 (relative to the carry shell 11), a horizontal alignment of the seat and back portion is achieved, the leg portion 16 simultaneously tilting downwards (and also being aligned horizontally).

In FIG. 5, a means 31 (actuating lever) can also be identified for releasing the sitting position (FIG. 6) and the reclining position (FIG. 5). Furthermore, a locking mechanism (not represented in detail in the figures) is provided via which the sitting position and reclining position can be locked. This locking mechanism can be unlocked and the corresponding position unlatched via the means 31. Preferably, not only end positions (which can be seen in FIGS. 5 and 6) but also intermediate positions of the seat unit 13 relative to the carry shell are lockable (for example, at least one or at least two or at least four intermediate positions).

It should be noted here that all the parts described above are claimed as essential to the disclosure considered alone and in any combination, in particular the details shown in the drawings. Modifications therefrom are familiar to the person skilled in the art.

LIST OF REFERENCE NUMBERS 10 child seat
11 carry shell
12 carrying grip
13 seat unit
14 back portion
15 seat portion
16 leg portion
17 upper backrest
18 shoulder strap
19 shoulder strap
20 strap slot
21 strap slot
22 strap slot
23 strap slot
24 strap guide
25 strap guide
26 rotating axle
27 rotating axle
28 linkage of rods
29 linkage of rods
30 guide linking rod
31 means
32 device
33 receiver
34 receiver
35 opening
36 opening
37 point
38 axle
39 end
40 axle
41 end
42 bar
43 connecting strut
44 connecting strut

The invention claimed is:

1. A child seat for a motor vehicle having a carry shell with a carrying grip and a seat unit arranged within the carry shell comprising:
   a back portion,
   a seat portion,
   a leg portion,
   an upper backrest, fitted on the back portion of the seat unit for movement in a direction to and from the seat portion,
   a device for altering the position of the upper backrest relative to the back portion, and
   a harness with two shoulder straps, each shoulder strap being passed through a corresponding slot in the back portion and in the upper backrest, wherein
   pivotally mounted strap guides are each assigned to the strap slots in the back portion, and
   wherein the two shoulder straps merge into or are connected to a Y-strap on a rear of the back portion below the two strap guides arranged on the rear, a distance between the strap guides and a point of the merging being variable.

2. The child seat according to claim 1, wherein the strap guides are each pivotally mounted on a rear of the back portion about axles extending approximately perpendicularly to the back portion.

3. The child safety seat according to claim 1, wherein the seat unit within the carry shell can be displaced from a sitting position with an angle of the back portion to the horizontal of more than 40° into a reclining position with the angle of the back portion to the horizontal of less than 20°, and vice versa.

4. The child seat according to claim 3, wherein the leg portion relative to the seat portion is arranged movably to said seat portion in such a way that the leg portion is tilted downwards relative to the seat portion when displacing the seat unit into the reclining position.

5. The child safety seat according to claim 4, wherein
when displacing the seat unit to the horizontal reclining position or back, the leg portion is mounted longitudinally displaceable in a guide connecting link arranged on the carry shell, said link being arc-shaped.

6. The child safety seat according to claim 3, wherein
the seat unit is lockable both in the sitting position and the reclining position and, a locking mechanism having a manually actuating means for unlocking or unlatching.

7. The child safety seat according to claim 6, wherein the seat unit is lockable in one or more intermediate positions relative to the carry shell.

8. The child seat according to claim 3, wherein
the back portion and the seat portion are hinged to the carry shell via a first linkage of rods and, the leg portion is hinged to the carry shell via a second linkage of rods.

9. The child seat according to claim 8, wherein
the linkage of rods assigned to the leg portion comprises two laterally hinged connecting struts in the proximity of a rear end, and free ends of said struts each being hinged to the carry shell.

10. The child seat according to claim 8, wherein
the linkage of rods assigned to the back portion and the seat portion comprises two laterally hinged connecting struts approximately half the length of the back and seat portion, free ends of said struts each being hinged to the carry shell.

11. The child seat according to claim 10, wherein
the linkage of rods assigned to the seat portion and the back portion extend away from a rear of the back portion while the linkage of rods assigned to the leg portion extends in the opposite direction.

\* \* \* \* \*